(12) United States Patent
Washima et al.

(10) Patent No.: US 8,124,275 B2
(45) Date of Patent: Feb. 28, 2012

(54) METHOD OF MANUFACTURING CATALYST CARRIER, CATALYST CARRIER, AND ELECTRODE OF FUEL CELL BATTERY

(75) Inventors: Mineo Washima, Tokyo (JP); Kenji Shibata, Tokyo (JP); Fumihito Oka, Tokyo (JP)

(73) Assignee: Hitachi Cable, Ltd., Tokyo (JP)

( * ) Notice: Subject to any disclaimer, the term of this patent is extended or adjusted under 35 U.S.C. 154(b) by 473 days.

(21) Appl. No.: 12/361,068

(22) Filed: Jan. 28, 2009

(65) Prior Publication Data

US 2009/0191431 A1 Jul. 30, 2009

(30) Foreign Application Priority Data

Jan. 30, 2008 (JP) ................. 2008-019347
Dec. 5, 2008 (JP) ................. 2008-310824

(51) Int. Cl.
| | |
|---|---|
| H01M 4/02 | (2006.01) |
| H01M 4/13 | (2010.01) |
| H01M 4/58 | (2010.01) |
| H01M 4/34 | (2006.01) |
| H01M 4/54 | (2006.01) |
| H01M 10/32 | (2006.01) |
| H01M 4/00 | (2006.01) |
| H01M 4/56 | (2006.01) |
| H01M 4/36 | (2006.01) |
| H01M 4/92 | (2006.01) |
| H01M 4/90 | (2006.01) |
| B32B 3/26 | (2006.01) |
| B22F 3/00 | (2006.01) |
| B22F 3/26 | (2006.01) |
| B22F 5/00 | (2006.01) |
| B22F 7/00 | (2006.01) |
| C22C 28/00 | (2006.01) |
| C22C 29/00 | (2006.01) |
| B05D 5/12 | (2006.01) |
| B05D 1/36 | (2006.01) |
| B05D 7/00 | (2006.01) |
| B05D 3/00 | (2006.01) |
| B05D 1/40 | (2006.01) |
| B05D 1/02 | (2006.01) |
| B05D 5/00 | (2006.01) |
| B05D 1/34 | (2006.01) |
| C23C 16/00 | (2006.01) |
| C23C 16/40 | (2006.01) |
| C23C 16/22 | (2006.01) |
| C23C 18/00 | (2006.01) |
| C23C 20/00 | (2006.01) |
| C23C 28/00 | (2006.01) |
| B28B 19/00 | (2006.01) |
| B29B 15/10 | (2006.01) |

(52) U.S. Cl. ............ 429/209; 429/218.1; 429/219; 429/220; 429/223; 429/225; 429/231.5; 429/231.6; 429/523; 429/524; 429/527; 429/528; 428/304.4; 428/546; 427/126.1; 427/126.2; 427/126.3; 427/126.4; 427/126.5; 427/126.6; 427/201; 427/202; 427/203; 427/205; 427/214; 427/215; 427/216; 427/217; 427/248.1; 427/250; 427/251; 427/255.15; 427/255.19; 427/255.23; 427/255.25; 427/255.395; 427/255.7; 427/295; 427/331; 427/419.1; 427/419.2; 427/421.1; 427/424; 427/426; 427/427

(58) Field of Classification Search .... 427/126.1–126.6, 427/201–203, 205, 214–217, 248.1, 250, 427/251, 255.15, 255.19, 255.23, 255.25, 427/255.395, 255.7, 295, 331, 419.1, 419.2, 427/421.1, 424, 426, 427; 428/546, 304.1, 428/304.4; 429/209, 218.1, 219, 220, 223, 429/225, 231.5, 231.6, 523, 524, 527, 528
See application file for complete search history.

(56) References Cited

U.S. PATENT DOCUMENTS

| | | | | |
|---|---|---|---|---|
| 3,437,605 | A | * | 4/1969 | Keith ............... 502/325 |
| 3,485,658 | A | * | 12/1969 | Iler ............... 428/328 |
| 6,106,955 | A | * | 8/2000 | Ogawa et al. ......... 428/469 |
| 6,455,108 | B1 | * | 9/2002 | Muffoletto et al. ...... 427/446 |

| | | | |
|---|---|---|---|
| 6,635,348 B1 * | 10/2003 | Hampden-Smith et al. | 428/402 |
| 2003/0083196 A1 * | 5/2003 | Korotkikh et al. | 502/326 |
| 2005/0100666 A1 * | 5/2005 | Hampden-Smith et al. | 427/212 |
| 2010/0266929 A1 * | 10/2010 | Kanemoto et al. | 429/488 |

FOREIGN PATENT DOCUMENTS

| JP | 03-231096 A1 | 10/1991 |
|---|---|---|
| JP | 3716913 A | 11/2005 |
| JP | 2006144054 A | 6/2006 |

* cited by examiner

*Primary Examiner* — Patricia L Hailey (74) *Attorney, Agent, or Firm* — Matrin Fleit; Paul D. Bianco; Fleit Gibbons Gutman Bongini & Bianco PL (57) ABSTRACT

To smoothly deliver a thermal energy required in an active site of a catalyst carried on a carrier. A method of manufacturing a catalyst carrier of the present invention includes the steps of: forming a mixed thin film in which at least metal and ceramics are mixed on a metal base, by spraying aerosol, with metal powders and ceramic powders mixed therein, on the metal base; and making the mixed thin film porous, by dissolving the metal of the mixed thin film into acid or alkaline solution to remove this metal.

20 Claims, 4 Drawing Sheets

METHOD OF MANUFACTURING CATALYST CARRIER, CATALYST CARRIER, AND ELECTRODE OF FUEL CELL BATTERY

BACKGROUND OF THE INVENTION

1. Field of the Invention

The present invention relates to a method of manufacturing a catalyst carrier, the catalyst carrier, and an electrode of a fuel battery cell.

2. Background Art

Conventionally, a catalyst carrier such as containing a noble metal, being a catalyst, dispersed and supported in a carrier, is a mainstream as a catalyst carrier. In order to provide a catalyst carrier having a high performance, a catalyst active material such as platinum (Pt) must be carried in a highly dispersed state. Therefore, it is important that a carrier material is a crystalline rough surface forming material, namely, it is important that the carrier is formed in a porous state. In addition, in recent years, the catalyst carrier is used in an electrode of a fuel battery cell, particularly used in an automobile. Therefore, in order to smoothly deliver energy required for activating the catalyst, a further thinner film of the carrier for catalyst is highly desired.

Zeolite, which is a typical example of a material for forming a crystalline rough surface, is an attractive material because of its fine hole structure, having solid acid property, ion exchange capacity, adsorption separation capacity, and fine holes of a molecular level. However, zeolite crystal does not have a self-sintering property. Thus, the zeolite can be obtained only in a form of powders under a normal hydrothermal synthesis condition, and it is difficult to form a film of the zeolite crystal. In addition, a blocking process by sintering is required for catalyst carrying ceramics focusing on alumina other than zeolite, and it is not easy to realize a thinner film. Therefore, a process of high cost and high temperature such as a CVD method must be used to realize the thinner film. Thus, in the conventional catalyst carrier, a base material is ceramics in many cases, and when a reaction occurs on the catalyst carried on the ceramics, it is difficult to perform a smooth heat conduction. Also, it is difficult to realize the thinner film of the catalyst carrier, because the base material must be prepared by sintering. For example, a honeycomb-like pellet is commercially-available as the catalyst carrier. This pellet has a size of a few centimeters because this pellet is prepared by being sintered at a high temperature. The catalyst active material such as Pt is precipitated on this carrier for catalyst by complex solution, etc, and is sintered and utilized for the catalyst carrier in many cases. In industrial fields, this type of catalyst-carrying pellet is used as a catalyst reactor stored in a container made of stainless for example. However, in a castalyst process using this catalyst container, exchange of heat required for the catalyst reaction is frequently performed via a ceramic base material with inferior heat conduction, and as a result, catalyst reaction efficiency is determined by this heat conduction. Therefore, excellent performance can not be exhibited.

Note that conventionally, a technique of forming a film on a substrate surface is proposed as a related art, as follows. According to the conventional technique, deposition processing is performed by splaying ultra fine particles on a workpiece, thereby improving a processing speed and processing accuracy (for example, see patent document 1). Film deposition is performed in such a manner that the second aerosol is sprayed, directed to the first aerosol, thereby activating a surface, and this activated second aerosol is sprayed on a base material. By this film deposition, a dense film with high film adhesion is realized (for example, see patent document 2). Particles are made to collide with each other at high speed and are deformed or crushed by impact of collision. Then, fine particles are mutually bonded via a newly formed active surface generated by deformation and destruction of the particles, to form a film coating. A fragile property of a structure, which is readily destructed, is thus prevented (for example, see patent document 3).

[Patent Publication 1] Japanese Laid-Open Publication No. H3-231096
[Patent Publication 2] Japanese Laid-Open Publication No. 2006-144054
[Patent Publication 3] Japanese Patent No. 3716913

When a base material for a catalyst carrier is ceramics, this base material is hardly formed into a film. For example, in a case of the zeolite, when its thickness is thinner, this thickness is close to a size of a crystal grain constituting the zeolite, and therefore an influence of this crystal grain can not be ignored. Accordingly, when the base material is zeorite, the base material of 100μm or less is hardly formed into a film. Therefore, it can be so considered that a substrate having an excellent heat conductivity is utilized as the base material, and by using the technique disclosed in the patent documents 1 to 3, ceramics powders are sprayed on the substrate having excellent heat conductivity, to form a thin film, so that this film carries the catalyst. However, a ceramic film formed on the substrate has a dense structure (paragraph [0011] of Patent Publication 2 and paragraph [0033] of Patent Publication 3), and therefore the ceramic film can not carry a large number of catalysts, like porous zeolite.

As a result, in a conventional catalyst carrier formed by using the aerosol deposition method, it is impossible to smoothly remove a thermal energy required for an exothermic reaction, at an active site of the catalyst carried on the ceramic film. In addition, it is impossible to smoothly transmit the thermal energy which is also required for an endothermic reaction. Further, it is impossible to respond to a request of development of an electrode of a fuel battery cell having excellent characteristics.

Therefore, the present invention is provided, and it is desired to provide a method of manufacturing a catalyst carrier capable of smoothly performing incoming and outgoing of the thermal energy required at the active site of the catalyst, the catalyst carrier, and an electrode of a fuel battery cell.

SUMMARY OF THE INVENTION

According to a first aspect of the present invention, a method of manufacturing a catalyst carrier is provided. The method includes the steps of: forming a mixed thin film in which at least metal and ceramics are mixed on a metal base, by spraying aerosol on the metal base, with metal powders and ceramics powders mixed therein; and making the mixed thin film porous, by dissolving the metal of the mixed thin film into acid or alkaline solution to remove this metal.

According to a second aspect of the present invention, a catalyst carrier is provided. The catalyst carrier includes: a metal base; a mixed thin film, being at least one thin film that exists on the metal base, composed of metal and ceramics formed by spraying aerosol on the metal base, with metal powders and ceramics powders mixed therein, and a large number of holes formed in the mixed thin film by dissolving and removing metal of the mixed thin film, for carrying the catalyst.

According to a third aspect of the present invention, an electrode of a fuel battery cell is provided. The electrode includes: a metal base; a mixed thin film, being at least one thin film that exists on the metal base, composed of metal and ceramics formed by spraying aerosol on the metal base, with metal powders and ceramics powders mixed therein; and a large number of holes formed in the mixed thin film by dissolving and removing metal of the mixed thin film, for carrying the catalyst.

According to the present invention, the incoming and outgoing of the thermal energy required in active sites of a carrier can be performed smoothly.

DETAILED DESCRIPTION OF THE INVENTION

A method of manufacturing a catalyst carrier and the catalyst carrier according to the present invention will be described hereunder, with reference to the attached drawings.

First, a catalyst carrier of one embodiment of the present invention will be described. The catalyst carrier means a carrier carrying a catalyst component. As the catalyst carrier, there is the one with a thin film containing a ceramic component of a single layer or double layer structure. Here, a case of the double layer structure will be described.

Figure 2:
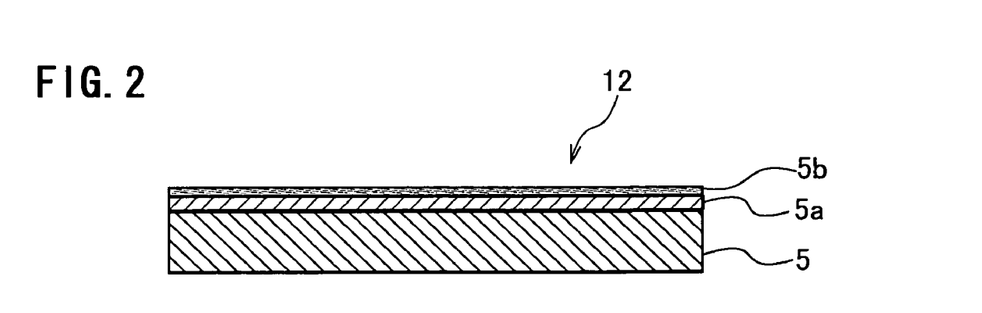
FIG. 2 is a cross-sectional view illustrating the structure of a catalyst carrier according to one embodiment of the present invention.

As shown in FIG. 2, a catalyst carrier 12 includes: a metal base 5 made of metal; a first thin film 5a made of ceramics formed by spraying aerosol of ceramic powders on the surface of this metal base 5; a second thin film 5b, being a mixed thin film composed of metal and ceramics formed by spraying the aerosol, in which the metal powders and ceramics powders are mixed, on the surface of this first thin film 5a; and a plurality of holes for carrying the catalyst, formed by making the second thin film 5b porous by dissolving and removing the metal of the second thin film 5b. Further, as shown in FIG. 2, the catalyst is carried on the plurality of holes of the second thin film 5b. The aforementioned first thin film 5a and the second thin film 5b are called a catalyst-carrying film.

The first thin film 5a is interposed between the metal base 5 and the porous second thin film 5b, to prevent a state that the film is fragile by making the second thin film 5b porous, resulting in a collapse of this film by damage such as a mechanical impact, and reliability is lowered.

According to the catalyst carrier of this embodiment, one or more effects as will be described next are exhibited. Even if the ceramics layer having great active site and thermal resistance is used as the catalyst carrying film, the ceramics layer can be made thin. Therefore, the thermal energy required at the active site of the catalyst can be delivered to the catalyst component smoothly. Also, the ceramic layer is formed on the metal base having high thermal conductivity, and therefore the thermal energy required for the active site of the catalyst can be delivered to the catalyst component further smoothly. In addition, the thin film is supported by the metal base, and therefore a mechanical strength of the thin film can be secured. Further, the ceramics thin film is formed into a porous state, and therefore the ceramics thin film can carry the catalyst with a high efficiency.

Note that the total thickness of the first thin film and the second thin film is preferably set at 100 μm or less, being an upper limit value required for making the film thin. The thickness of the first thin film is preferably set at 0.01 μm to 100 μm. Particularly, when the thickness of the first thin film is set at 0.01 μm to 10 μm, the upper limit value required for making the thin film can be secured, even if the thickness of the second thin film is added thereto. The second thin film is preferably set at 0.01 μm to 10 μm. When the thickness of the second thin film is set at 0.01 μm to 10 μm, the film can be made porous while maintaining a sufficient thinness.

In addition, the surface of the metal powder is oxidized to prevent agglutination. Noble metals such as platinum (Pt), palladium (Pd), ruthenium (Ru), rhodium (Rh), or an alloy system including any one of these noble metals, can be given as the catalyst components. Also, copper, nickel, tin, lead, silver, or aluminum dissolved in acid solution or alkaline solution and removed, can be given as the component of the metal powders. In addition, alumina, niobium oxide, titania, magnesia, or the mixture thereof functioning as solid acid or behaving as solid acid, can be given as the components of the ceramics powders. Further, stainless, etc, having excellent heat conductivity, which is not dissolved in acid solution or alkaline solution can be given as a material of the metal base.

Next, an example of the aerosol deposition apparatus used in the method of manufacturing the catalyst carrier according to the present invention will be described, with reference to FIG. 1.

Figure 1:
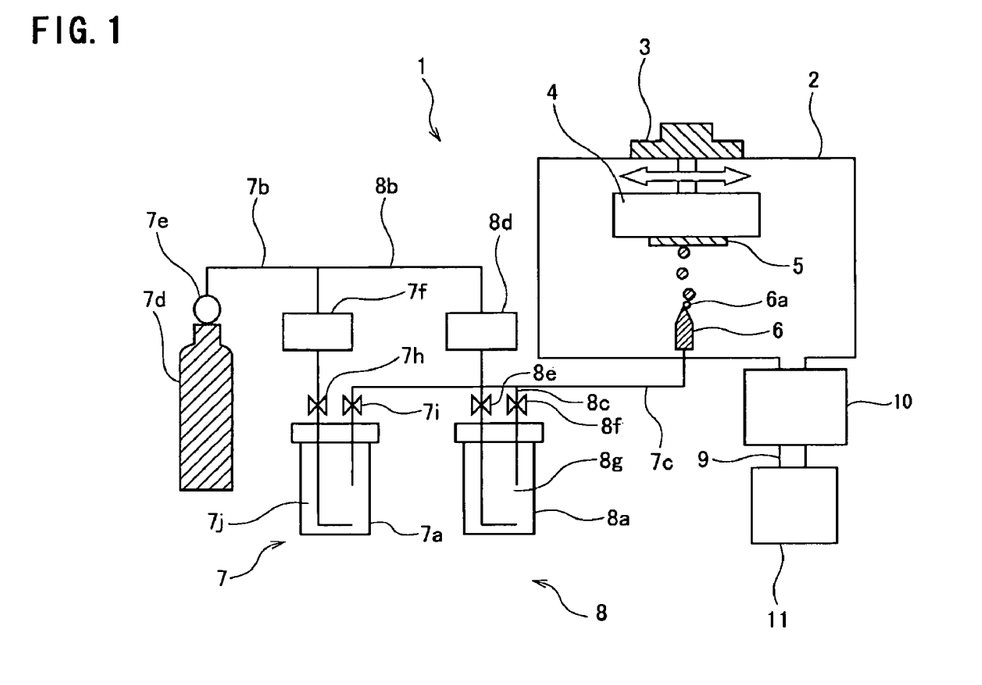
FIG. 1 is an explanatory view illustrating a structure of an aerosol deposition apparatus for a two-layer structure according to one embodiment of the present invention.

FIG. 1 is an explanatory view of the aerosol deposition apparatus. A chamber 2 is provided in the aerosol deposition apparatus 1 as a processing chamber. An XY stage 3 is provided on one side in the chamber 2, so as to be freely movable in the X-axial direction (for example, horizontal direction) and the Y-axial direction (for example, vertical direction), and a substrate holder 4 is integrally provided in the XY stage 3. A base 5 made of metal is held by the base holder 4, as a base. Also, a nozzle 6 is provided on the other side in the chamber 2, because the catalyst carrying film (as will be described later) is formed so as to cover a surface. The one side and the other side in the chamber 2 correspond to the upper side and the lower side in the chamber 2, respectively. The base 5 may be formed of general-purpose metal. For example, the base 5 may be made of highly corrosion-resistant stainless steel. A nozzle opening 6a of the nozzle 6 can be set, so as to face the surface of the base 5. Note that a prescribed space is formed between the nozzle mouth (spraying outlet) 6a and the surface of the base 5. In addition, an exhaust pipe 9 for exhausting an atmosphere in the chamber is provided in the chamber 2, with this exhaust pipe 9 including a filter device 10 and a vacuum pump 11 for reducing pressure of the atmosphere in the chamber by exhaust.

A first aerosol feeder 7 is attached to the nozzle 6, for spraying the aerosol (called a catalyst carrying film forming aerosol hereafter) composed of ceramic powders and conveying fluid, from the nozzle 6 and spraying this aerosol on the base 5. A second aerosol feeder 8 is attached to the first aerosol feeder 7, for mixing the aerosol (called a rough surface forming aerosol hereafter) composed of the metal powders and the conveying fluid, with the catalyst carrying film forming aerosol on the upper stream side of the nozzle 6, and spraying this aerosol from the nozzle 6.

The first aerosol feeder 7 includes a first aerosol generating container 7a for generating the catalyst carrying film forming aerosol; an upper stream side piping 7b for feeding the conveying fluid to the first aerosol generating container 7a and generating the catalyst carrying film forming aerosol; a lower stream side piping 7c for feeding the catalyst carrying film forming aerosol generated in the first aerosol generating container 7a, to the nozzle 6; and a gas cylinder 7d as a conveying fluid feeding source.

A pressure reducing valve 7e is provided in the upper stream side piping 7b of the first aerosol feeder 7, and a first mass flow controller 7f for adjusting a flow rate of the conveying fluid is provided on the lower stream side of the pressure reducing valve 7e. In addition, a first open/close valve 7h for switching on/off of the feeding of the conveying fluid is provided on the lower stream side of the first mass flow controller 7f of the upper stream side piping 7b.

A second open/close valve 7i for switching on/off of the feeding of the aerosol to the nozzle 6 is provided on the lower stream side piping 7c of the first aerosol feeder 7.

The ceramic powders are charged into the first aerosol generating container 7a, namely into the first aerosol-generating room 7j, and the gas cylinder 7d is filled with the conveying fluid as inert gas, and is filled with, for example, nitrogen gas ($N_2$ gas) as liquid nitrogen.

The second aerosol feeder 8 includes the second aerosol generating container 8a that generates the rough surface forming aerosol; an upper stream side piping 8b for feeding the conveying fluid to the second aerosol generating container 8a; and a lower stream side piping 8c for joining into the lower stream side piping 7c of the first aerosol feeder 7.

In order to share the gas cylinder 7d, one end of the upper stream side piping 8b of the second aerosol feeder 8 is connected to a part between the pressure reducing valve 7e of the upper stream side piping 7b of the first aerosol feeder 7, and the first mass flow controller 7f, and the other end thereof is inserted into the second aerosol generating container 8a. one end of the lower stream side piping 8c of the second aerosol feeder 8 is inserted into the second aerosol generating container 8a, and the other end thereof is connected to the lower stream side piping 7c of the first aerosol feeder 7.

Then, a second mass flow controller 8d and a third open/close valve 8e are provided in the upper stream side piping 8b of the second aerosol feeder 8 from the upper stream side toward the lower stream side, and a fourth open/close valve 8f is provided in the lower stream side piping 8c of the second aerosol feeder 8.

Metal powders are charged into the second aerosol generating container 8a, namely into the second aerosol-generating room 8g.

Next, a method of manufacturing a catalyst carrier according to this embodiment will be described, with reference to FIG. 1 and FIG. 2.

FIG. 2 is a sectional view of the catalyst carrier according to an embodiment of the present invention.

In this embodiment, first, ceramics powders (powders, particles (including fine particles)), being a catalyst-carrying film formation material, and the catalyst-carrying film forming aerosol containing $N_2$ gas, being the conveying fluid, are sprayed from the nozzle 6 to the surface of the metal base 5. The catalyst carrying film forming aerosol is collided with the surface of the base 5 by this spray, thereby forming a first layer (undercoat film) 5a of the catalyst carrying film on the surface of the base 5. A spraying speed of the catalyst carrying film forming aerosol from the nozzle 6 is set at 10 m/min to 1000 m/min.

Next, the rough surface forming aerosol containing metal and $N_2$ gas is joined into the catalyst carrying film forming aerosol, and is collided with the surface of the first layer 5a by the aerosol deposition method for spraying the aerosol on the first layer 5a. Thus, the second layer 5b, in which the metal powders (powders, particles (including fine particles)) and the ceramic powders are mixed, is formed on the second layer 5b.

However, in a case of a non-electroneutral metal powders, aggregation easily occurs, and when the aggregation occurs, it is difficult to return to an original state even if the conveying fluid is stirred. Therefore, the metal powders are preferably subjected to natural oxidation for example to form an oxide film on the surface of the metal powders so that the metal powders can behave as powders.

Prior to the formation of the first layer 5a, the pressure of the chamber 2 is reduced as follows. The vaccum pump 11 is operated, with the open/close valve 7h closed, and other open/close valves (second open/close valve 7i, third open/close valve 8e, and fourth open/close valve 8f opened, and the pressure of an inside of the chamber 2 is reduced to the atmospheric pressure or less and preferably reduced to a low vacuum state. The low vacuum state is a state of, for example, 1Pa to 1000Pa.

In the case of forming the aforementioned first layer 5a, first, the pressure in the chamber 2 is maintained to a lower vacuum, then the third open/close valve 8e, the fourth open/close valve 8f, and the second open/close valve 7i are closed, and only the first open/close valve 7h is opened. Thus, the $N_2$ gas, being the conveying fluid, is introduced to the first aerosol-generating room 7j. By introduction of the $N_2$ gas, the inside of the first aerosol-generating room 7j is stirred, and powders of a catalyst carrying film forming material in the first aerosol-generating room 7j are stirred in such a manner as flying, to generate the aerosol of the catalyst carrying film formation material.

Next, the second open/close valve 7i is opened, while the third open/close valve 8e and the fourth open/close valve 8f are closed, and the first open/close valve 7h is opened. Simultaneously, the XY stage 3 in the X-axial direction and the Y-axial direction, which is provided on one side in the chamber 2, is scanned to scan the base 5 in the X-axial direction and in the Y-axial direction, and the catalyst carrying film forming aerosol sprayed from the nozzle 6, which is provided on the other side in the chamber 2, is collided with the surface of the base 5 uniformly in a plane.

At this time, the speed of the ceramic powders is adjusted by the first mass flow controller 7f, so that the newly formed surface appears by crush. Therefore, the ceramic powders in the catalyst carrying film forming aerosol are destructed by the collision between the base 5 and the surface, and the newly formed surface is exposed. Thus, the powders crushed on the surface of the base 5 are mutually bonded, and the first layer 5a of the catalyst carrying film is formed on the surface of the base 5.

In the case of forming the aforementioned second layer 5b, the pressure in the chamber 2 is maintained to the same pressure as the case of the first layer 5a. Then, in this state, the third open/close valve 8e is opened while the first open/close valve 7h is opened. Also, the second open/close valve 7i is closed while the fourth open/close valve 8f is closed. Thus, the $N_2$ gas is introduced to the first aerosol-generating room 7j and the second aerosol-generating room 8g. The catalyst carrying film forming aerosol is generated in the first aerosol-generating room 7j, and the rough surface forming aerosol is generated in the second aerosol-generating room 8g.

Next, the second open/close valve 7i and the fourth open/close valve 8f are opened, while the first open/close valve 7h and the third open/close valve 8e are opened. Simultaneously, the XY stage of the base 5 is scanned in the X-axial direction and in the Y-axial direction by scanning the XY stage in the X-axial direction and in the Y-axial direction, and the catalyst carrying film forming aerosol and the the rough surface forming aerosol are collided with the first layer 5a in a joined state. Thus, the ceramic powders are destructed, and the newly formed surface is thereby exposed. Therefore, the second layer 5b, in which the ceramics and the metal are mixed, is formed on the second layer 5b of the base 5.

After the formation of the second layer 5b, the metal is dissolved by dissolving operation of acid or alkaline solution so as to be removed from the second layer 5b, and the second layer 5b is made porous.

Next, a metal catalyst, being the catalyst, is carried on the second layer 5b thus made porous. Specifically, the second porous layer 5b is subjected to wet plating by metal catalyst solution. Thus, the metal catalyst is separated out from the metal catalyst solution and is carried on the surface of the second layer 5b and a plurality of thin holes.

According to this embodiment, the following one or more advantages are exhibited.

According to the present invention, the aerosol deposition method is adopted, and therefore the thin film made of ceramics can be easily formed. Also, the thin film made of ceramics is formed on a metal base, and therefore the mechanical strength of the thin film made of ceramics can be easily secured. Also, the first layer 5a and the second layer 5b made of ceramics are respectively thin films, and therefore the heat conductivity is high. Further, the second layer 5b is brought into close contact with the base 5 made of metal having high heat conductivity via the first layer 5a. Therefore, the thermal energy required at the active site of the catalyst can be smoothly delivered. Namely, a reactant can be activated by both solid acid and catalyst reaction of the ceramic layer.

In addition, the thin film made of ceramics, being the catalyst carrier, can be made easily porous, by a simple method such as dissolving and removing only the metal, after forming a mixed thin film composed of the metal and the ceramics by using the aerosol in which the ceramic powders and the metal powders are mixed. An effective surface area of the second layer 5b of the catalyst carrier 12 thus manufactured is tremendously increased, compared with a case in which the second layer is densely formed. Accordingly, further more catalyst components can be carried, and therefore capability of the catalyst components with respect to the reactant can be strengthened. Particularly, the catalyst carrier is made of metal base and a ceramic layer having a porous surface is formed on the surface of the base. Also, the ceramic layer is thin, and therefore the heat conductivity can be made low. In addition, the heat conductivity of the metal base, being the base of the ceramic layer, is tremendously high compared with the case of the ceramics. Therefore, it is possible to smoothly perform incoming and outgoing of the thermal energy required at the active site of the catalyst.

In addition, the second thin film fragile by being made porous is supported by the first thin film. Therefore, it is possible to easily prevent lowering of reliability such as collapse of the film due to a mechanical impact. Accordingly, although in a simple step, it is possible to easily manufacture the catalyst carrier capable of smoothly performing the incoming and outgoing of the thermal energy required at the active site of the catalyst.

The catalyst carrier 12 is the catalyst carrier suitable for both of a heat dissipating reaction and a heat absorbing reaction, and is used in dehydrogenation and hydrogenation process apparatuses in a petrochemical industry. Alternatively, the catalyst carrier 12 according to this embodiment also can be used in a wide range of fields such as a catalyst carrier as an electrode provided between separators of a fuel battery cell.

Figure 6:
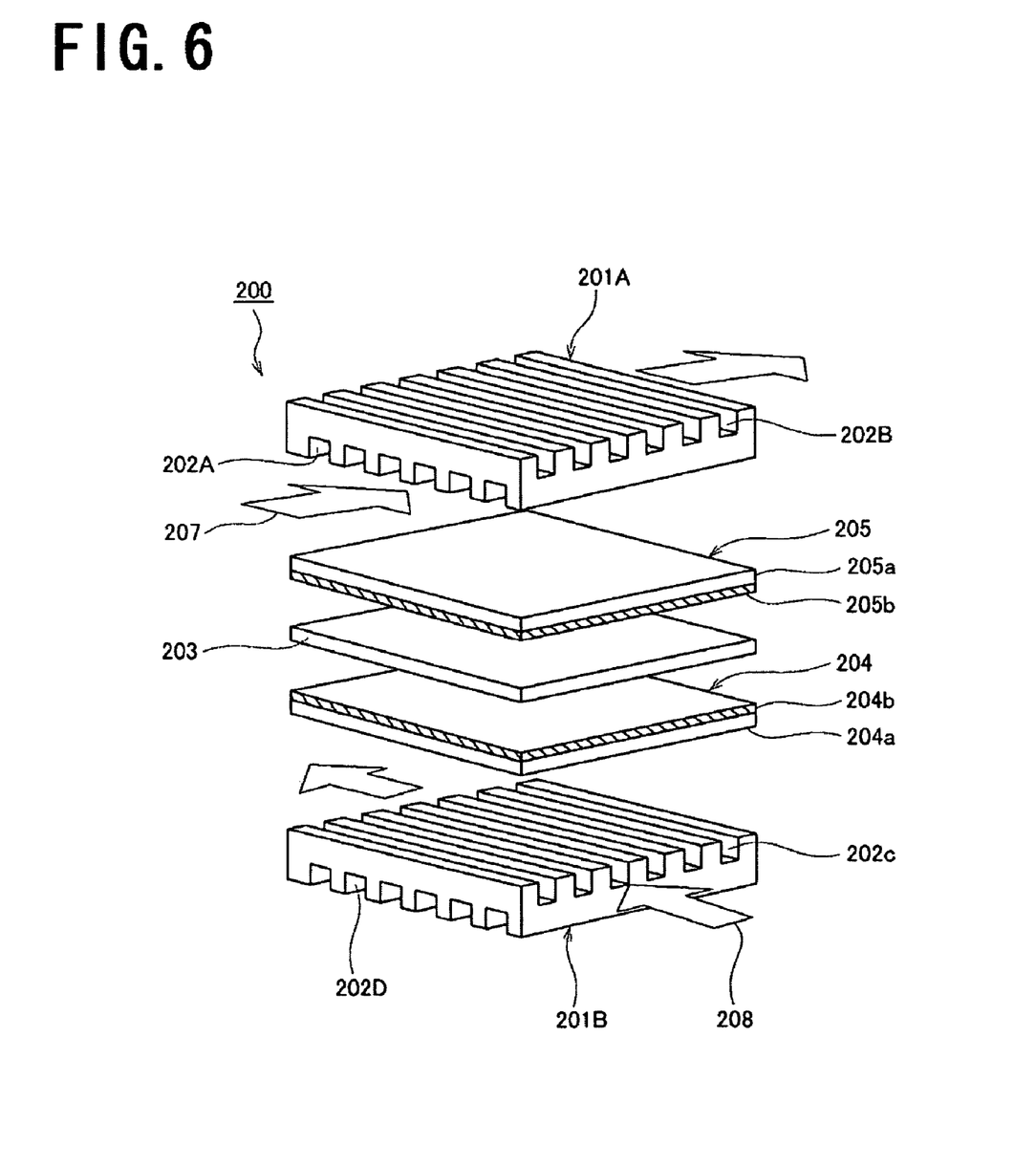
FIG. 6 is a schematic block diagram of a solid polyelectrolyte fuel battery cell to which the catalyst carrier according to one embodiment of the present invention is applied.

FIG. 6 illustrates a schematic structure of a solid polymer electrolyte fuel cell, being the fuel battery cell provided with such a catalyst carrier. This solid polymer electrolyte fuel cell 200 is constituted by connecting a plurality of cells in a vertical direction (upper and lower direction in FIG. 6). One cell has a pair of flat plate-like separators 201A and 201B having grooves 202A, 202B, 202C, and 202D formed on both sides at a predetermined interval; an electrolyte film 203 disposed at an intermediate position of the separators 201A and 201B; an air electrode 204 as the catalyst carrier disposed between the electrolyte film 203 and the separator 201B; and a fuel electrode 205 as the catalyst carrier disposed between the electrolyte film 203 and the separator 201A.

The separators 201A and 201B are members for electrically connecting the air electrode 204 and the fuel electrode 205 and preventing fuel from being mixed with air (oxidant). The grooves 202B and 202D are used as a passage of the fuel of vertically connected cells and the passage of air.

The electrolyte film 203 is constituted by using a high-polymer electrolyte film. The air electrode 204 is constituted by including the metal base 204a and the catalyst-carrying film 204b according to one embodiment of the present invention. The fuel electrode 205 is also constituted by including the metal base 205a and the catalyst-carrying film 205b according to one embodiment of the present invention.

In FIG. 6, when air 208 is brought into contact with the air electrode 204, and simultaneously when hydrogen gas 207, being the fuel, is brought into contact with the fuel electrode 205, the hydrogen gas 207 is divided into a hydrogen ions and an electrons on the fuel electrode 205. This hydrogen ion is moved with water to the air electrode 204 side. Meanwhile, the electron is moved to the air electrode side 204 via an external circuit. In the air electrode 204, oxygen ($O_2/2$), electrons ($2e-$), and hydrogen ions ($2H^+$) react with one another to generate water ($H_2O$).

According to the fuel battery cell of this embodiment, high performance of the catalyst carrier can be realized, and high catalyst activity can be maintained.

In the above-described embodiment, the catalyst-carrying film forming aerosol and the rough surface forming aerosol are joined into each other in the piping (the lower stream side piping 7c) and the aerosol after joining is sprayed from a common nozzle 6, thereby forming the second layer 5b on the first layer 5a. However, it may be also preferable that the second layer 5b is formed in such a manner that the catalyst-carrying film forming aerosol and the rough surface forming aerosol are separately sprayed through different nozzles, and after the first layer 5a is formed by the catalyst carrying film forming aerosol sprayed from one of the nozzles, the catalyst carrying film forming aerosol and the rough surface forming aerosol are sprayed from one of the nozzles and the other nozzle, respectively, to be joined with each other in front of the base 5.

Figure 3:
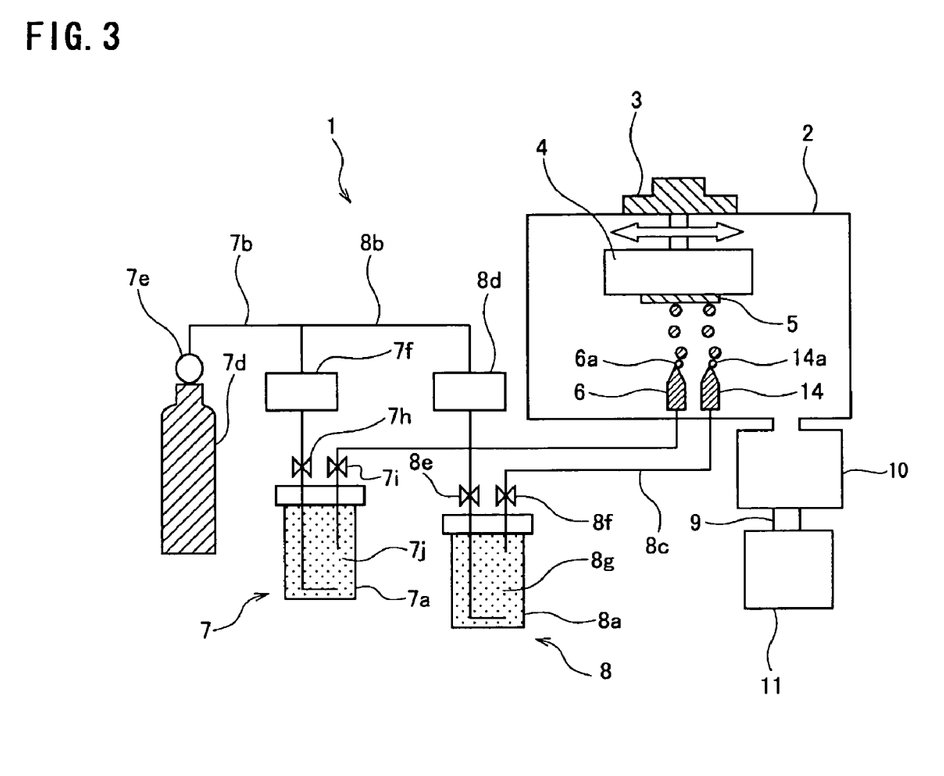
FIG. 3 is an explanatory view illustrating the aerosol deposition apparatus for a two-layer structure according to another embodiment of the present invention.

FIG. 3 illustrates other embodiment of the aerosol deposition apparatus as described above.

In the aerosol deposition apparatus 15 of this embodiment, a second nozzle 14 is provided in the chamber 2 so as to be adjacent to the first nozzle, when the nozzle 6 is set as the first nozzle. The lower stream side piping 8c of the second aerosol feeder 8 is separated from the lower stream side piping 7c of the first aerosol feeder 7 and is connected to the second nozzle 14. Thus, the aerosol of the rough surface forming material sprayed from the second nozzle 14 can be joined into the aerosol of the catalyst carrying film forming material sprayed from the nozzle 6, and the joined aerosol can be collided with the surface of the first layer 5a of the base 5.

The other conditions are the same as that of the aerosol deposition apparatus 1 described with reference to FIG. 1.

Thus, in this embodiment also, as described above, only by switching the first open/close valve 7h, the second open/close valve 7i, the third open/close valve 8e, and the fourth open/close valve 8f, and only by scanning the XY stage in the X-axial direction and in the Y-axial direction, the first layer 5a can be formed on the base 5, and the second layer 5b can be formed on the first layer 5a.

Alumina, niobium oxide, titania, magnesia and the mixture thereof are given as examples of the ceramics for forming the catalyst carrying film. However, any ceramics may be preferable if it is the ceramics material that functions as solid acid or behaves as the solid acid as a function of a carried catalyst active material is increased, provided that it is a ceramic material that functions as the solid acid or behaves as the solid acid.

In addition, copper, nickel, tin, lead, silver, and aluminum material, etc, thereby having no influence on spraying of the powders of a catalyst carrying material, are given as examples of the rough surface forming material for forming the second layer 5b of porous or rough surface. However, any metal powders may be used, provided that it can be dissolved by acid or alikaline solution and the second layer 5b of porous or rough surface can be formed.

Also, this embodiment describes a point that the second layer 5b is formed on the first layer 5a formed on the stainless base 5. However, the second layer 5b may be formed directly on the base 5 made of metal, when it is formed by SUS316 which is particularly hardly influenced by the catalyst reaction among stainless bases 5.

Further, according to the aforementioned embodiment, the second layer 5b is made porous. However, the second layer 5b may also have a rough surface.

EXAMPLE 1

An example of the present invention will be described hereunder, with reference to FIG. 1, FIG. 2, FIG. 4, and FIG. 5.

In this example, the catalyst carrier 12 described in FIG. 2 was manufactured by the aerosol deposition apparatus 1 described in FIG. 1.

Stainless (SUS316) plate was used in the base 5, and powders of alumina were charged into the first aerosol-generating room 7j, and powders of metal aluminum were charged into the second aerosol-generating room 8g. An average particle size of the powders of alumina was set to approximately 50 μm. Metal aluminum powders before being charged were subjected to the oxidation of the surface to have thereon an oxide film, and these metal aluminum powders were used.

A nitrogen cylinder was used as the gas cylinder 7d. An interval of about 10 mm was provided between the nozzle mouth (spraying outlet) 6a and the surface of the stainless base 5. A flow rate value of the first mass flow controller 7f was adjusted so that alumina powders were sprayed from the nozzle 6 to the surface of the stainless base 5 at a high speed of 100 m/sec or more. The flow rate value of the second mass flow controller 8d was adjusted to a flow rate, thereby having no influence on the speed of the catalyst carrying film forming aerosol sprayed from the nozzle 6, namely, the speed of the powders of alumina.

In the case of forming the first layer 5a and the second layer 5b, the pressure in the chamber was set to approximately 100Pa, by exhausting with the vacuum pump 11. When the first open/close valve 7h was closed, and other open/close valves (second open/close valve 7i, the third open/close valve 8e, and the fourth open/close valve 8f were closed, the inside of the first aerosol generating room 7j was stirred by the $N_2$ gas supplied to the first aerosol-generating room 7j from the gas cylinder 7d, and the powders of alumina were stirred in such a manner as flying in the first aerosol-generating room 7j.

In addition, the third open/close valve 8e was opened, and other open/close valves (the first open/close valve 7h, the second open/close valve 7i, and the fourth open/close valve 8f) were closed, to introduce the $N_2$ gas only to the second aerosol-generating room 8g. The powders of metal aluminum were stirred in the second aerosol-generating room 8g in such a manner as flying.

Thus, when the surface of the powders of the metal aluminum was previously oxidized, it was confirmed that agglutination of the powders of the metal aluminum was prevented, and reliability of generating aerosol was improved.

Figure 4:
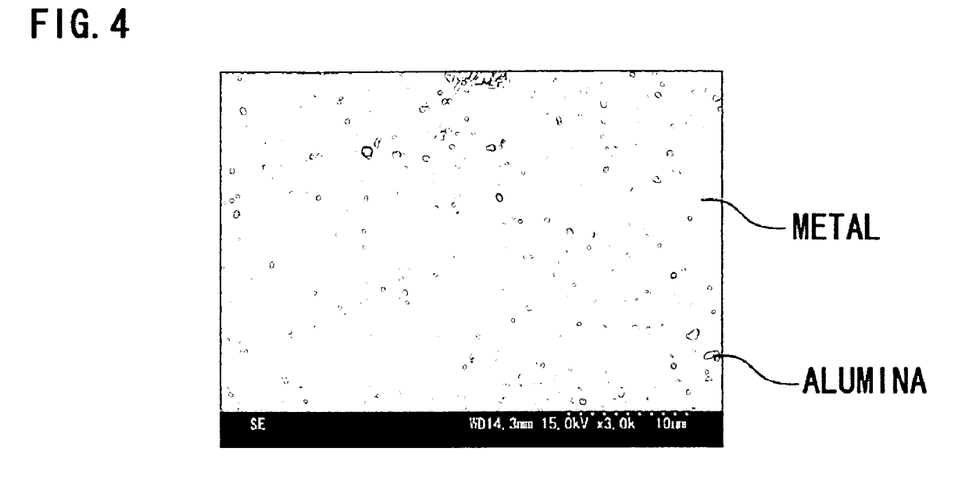
FIG. 4 is a view illustrating a state of a surface of a first layer of the catalyst carrier according to one embodiment of the present invention.

Next, the first open/close valve 7h and the second open/close valve 7i were opened, with the third open/close valve 8e and the fourth open/close valve 8f closed, and simultaneously by scanning the XY stage 3 in the X-axial direction and in the Y-axial direction, the catalyst carrying film forming aerosol was sprayed on the surface of the stainless base 5 by 50 reciprocations, and a first thin film 5a of alumina having a thickness of 5μm was formed on the surface of the stainless base 5. FIG. 4 shows an electron microscope photograph of the surface of the first thin film 5a of alumina thus formed on the stainless base 5. By collision, cracks occur in the first thin film 5a of alumina formed on the surface of the stainless base 5, resulting in a small particle size. Although a film forming rate is greatly different, depending on a shape and a state of the nozzle 6, destruction of the powders of alumina by collision with the stainless base 5 causes a crystal lattice to be exposed to generate the newly formed surface. Therefore, the first thin film of alumina is fixed to the surface of the stainless base 5, with strong adhesion.

In this state also, platinum having a catalyst function can be carried on the first layer 5a of alumina in principle. However, the first layer 5a of alumina is formed densely and therefore the effective surface area is not made large so much. Accordingly, a porous second thin film is desired to carry further more platinum catalyst.

Next, the third open/close valve 8e was opened, and the $N_2$ gas was also supplied to the second aerosol-generating room 8g from the gas cylinder 7d, then the fourth open/close valve 8f was opened, to spray the aerosol on the first layer 5a from the nozzle 6, which was the joined aerosol of the catalyst carrying film forming aerosol and the rough surface forming aerosol, and simultaneously the second layer 5b having a thickness of 2 μm composed of alumina and metal aluminum was formed on the firsta layer 5a of alumina by scanning the XY stage 3 in the X-axial direction and in the Y-axial direction by 10 reciprocations. The catalyst carrier thus formed before being made porous is called a sample.

Next, this sample was immersed in sodium hydroxide of 1 mol/liter for 5 minutes. Thus, only metal aluminum was dissolved from the second layer 5b composed of alumina and metal aluminum, thereby forming a porous second layer 5b made of alumina.

Figure 5:
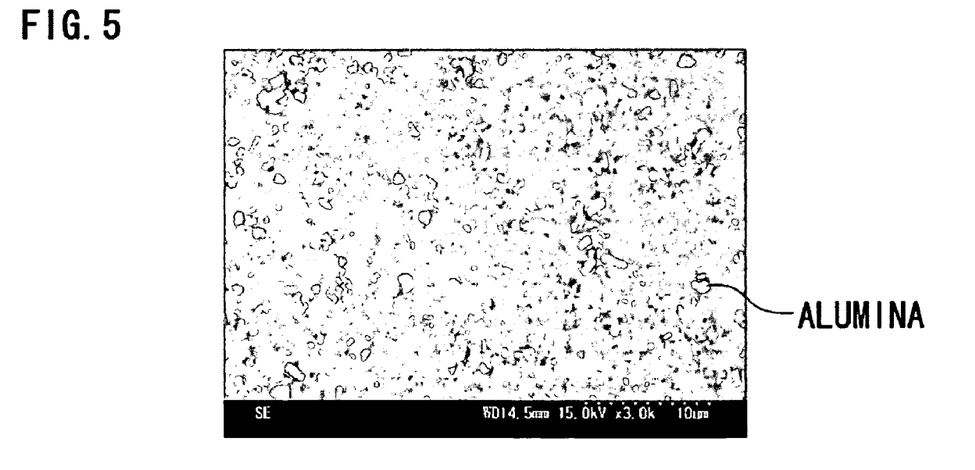
FIG. 5 is a view illustrating the state of the surface of a second layer of the catalyst carrier according to one embodiment of the present invention.

FIG. 5 shows an electron microscope photograph of the surface of the second layer 5b. Thus, it was found that the surface of the second layer 5b was made porous, and the effective surface area was tremendously increased.

Note that the thickness of the first layer 5a was set at 5 μm from the size and a film deposition condition of the alumina powders. However, any thickness may be preferable, because the alumina is only required to function as the solid acid. Next, the platinum, being the catalyst, is carried on the porous made on the second layer 5b of alumina. Then, the second layer 5b was subjected to wet plating using platinum catalyst solution. Thus, platinum catalyst is precipitated from the platinum catalyst solution and is carried on a large number of holes of the second layer 5b. The catalyst carrier carrying the platinum is used as the catalyst carrier, being an electrode provided between separators of a fuel cell battery.

The scope of the present invention is not limited to the aforementioned embodiments and examples, and various modified aspects are possible. The scope of the present invention is defined by claims, and all modifications within the scope of the claims or the modifications equivalent to the scope of the claims are incorporated in the claims.

Regarding the above-described description, additional description will be given hereunder.

In additional description 1, there is provided a method of manufacturing a catalyst carrier, comprising the steps of: forming a mixed thin film in which at least metal and ceramics are mixed on a metal base, by spraying aerosol on the metal base, with metal powders and ceramics powders mixed therein,; and making the mixed thin film porous, by dissolving the metal of the mixed thin film into acid or alkaline solution to remove this metal.

In additional description 2, there is provided the method of manufacturing the catalyst carrier according to the additional description 1, comprising the steps of: forming a first thin film made of ceramics on the metal base, by spraying the aerosol of the ceramics powders on the metal base; and forming the mixed thin film on the first thin film as a second thin film.

In additional description 3, there is provided the method of manufacturing the catalyst carrier according to the additional description 1, comprising the step of: carrying the catalyst on a large number of holes of the porous mixed thin film.

In additional description 4, there is provided the method of manufacturing the catalyst carrier according to the additional description 1, wherein: a thickness from a surface of the metal base to a surface of the mixed thin film is 0.1μm to 100μm.

In additional description 5, there is provided the method of manufacturing the catalyst carrier according to the additional description 1, wherein: a surface of each metal powder is oxidized.

In additional description 6, there is provided the method of manufacturing the catalyst carrier according to the additional description 1, wherein: the catalyst is platinum.

In additional description 7, there is provided the method of manufacturing the catalyst carrier according to the additional description 1, wherein: the metal powders are any one of copper, nickel, tin, lead, silver, or aluminum powders.

In additional description 8, there is provided the method of manufacturing the catalyst carrier according to the additional description 1, wherein: the ceramics powders are any one of alumina, niobium oxide, titania, or magnesia powders or the mixture thereof.

In additional description 9, there is provided the method of manufacturing the catalyst carrier according to the additional description 1, wherein: the metal base is a stainless base.

In additional description 10, there is provided a catalyst carrier, comprising: a metal base; a mixed thin film, being at least one thin film that exists on the metal base, composed of metal and ceramics formed by spraying aerosol on the metal base, with metal powders and ceramics powders mixed therein; and a large number of holes formed in the mixed thin film by dissolving and removing metal of the mixed thin film, to carry the catalyst thereon.

In additional description 11, there is provided the catalyst carrier according to the additional description 10, comprising: a first thin film made of ceramics, between the metal base and the mixed thin film, wherein the first thin film is formed by spraying the aerosol of the ceramics powders on the metal base, and the mixed thin film is formed on the first thin film as a second thin film.

In additional description 12, there is provided the catalyst carrier according to the additional description 10, wherein: the catalyst is carried on a large number of holes of the mixed thin film.

In additional description 13, there is provided the catalyst carrier according to the additional description 10, wherein: a thickness from a surface of the metal base to a surface of the mixed thin film is 0.1 μm to 100 μm.

In additional description 14, there is provided the catalyst carrier according to the additional description 10, wherein: a surface of each metal powder is oxidized.

In additional description 15, there is provided the catalyst carrier according to the additional description 10, wherein: the catalyst is platinum.

In additional description 16, there is provided the catalyst carrier according to the additional description 10, wherein: the metal powders are any one of copper, nickel, tin, lead, silver, or aluminum powders.

In additional description 17, there is provided the catalyst carrier according to the additional description 10, wherein: the ceramics powders are any one of alumina, niobium oxide, titania, or magnesia powders or the mixture thereof.

In additional description 18, there is provided the catalyst carrier according to the additional description 10, wherein: the metal base is a stainless base.

In additional description 19, there is provided an electrode of a fuel battery cell, comprising: a metal base; a mixed thin film, being at least one thin film that exists on the metal base, composed of metal and ceramics formed by spraying aerosol on the metal base, with metal powders and ceramic powders mixed therein; and a large number of holes formed in the mixed thin film by dissolving and removing metal of the mixed thin film, to carrying the catalyst thereon.

In additional description 20, there is provided the electrode of the fuel battery cell according to the additional description 19, comprising: a first thin film made of ceramics, between the metal base and the mixed thin film, wherein the first thin film is formed by spraying the aerosol of ceramic powders on the metal base, and the mixed thin film is formed on the first thin film as a second thin film.

In additional description 21, there is provided the electrode of the fuel battery cell according to the additional description 19 wherein the catalyst is carried on the large number of holes of the mixed thin film.

In additional description 22, there is provided the electrode of the fuel battery cell according to the additional description 19, wherein: a thickness from a surface of the metal base to a surface of the mixed thin film is 0.1 μm to 100 μm.

In additional description 23, there is provided the electrode of the fuel battery cell according to the additional description 19, wherein a surface of each metal powders is oxidized.

In additional description 24, there is provided the electrode of the fuel battery cell according to the additional description 19, wherein: the catalyst is platinum.

In additional description 25, there is provided the electrode of the fuel battery cell according to the additional description 19, wherein: the metal powders are any one of copper, nickel, tin, lead, silver, or aluminum powders.

In additional description 26, there is provided the electrode of the fuel battery cell according to the additional description 19, wherein: the ceramic powders are any one of alumina, niobium oxide, titania, or magnesia powders or the mixture thereof.

In additional description 27, there is provided the electrode of the fuel battery cell according to the additional description 19, wherein: the metal base is a stainless base.

DESCRIPTION OF REFERENCE NUMERALS

5 Base
5a First thin film
5b Second thin film

What is claimed is:

1. A method of manufacturing a catalyst carrier, comprising the steps of:
   forming a mixed thin film in which at least metal and ceramics are mixed on a metal base, by spraying aerosol on the metal base, with metal powders and ceramic powders mixed therein;
   making the mixed thin film porous, by dissolving the metal of the mixed thin film into acid or alkaline solution to remove this metal;
   forming a first thin film made of ceramics on the metal base, by spraying the aerosol of the ceramic powders on the metal base; and
   forming the mixed thin film on the first thin film as a second thin film.

2. The method of manufacturing the catalyst carrier according to claim 1, comprising the step of:
   carrying the catalyst on a plurality of holes of the porous mixed thin film.

3. The method of manufacturing the catalyst carrier according to claim 1, wherein:
   a thickness from a surface of the metal base to a surface of the mixed thin film is 0.1 μm to 100 μm.

4. The method of manufacturing the catalyst carrier according to claim 1, wherein: a surface of each metal powder is oxidized.

5. The method of manufacturing the catalyst carrier according to claim 1, wherein: the catalyst is platinum.

6. The method of manufacturing the catalyst carrier according to claim 1, wherein: the metal powders are any one of copper, nickel, tin, lead, silver, or aluminum powders.

7. The method of manufacturing the catalyst carrier according to claim 1, wherein: the ceramic powders are any one of alumina, niobium oxide, titania, or magnesia powders or the mixture thereof.

8. The method of manufacturing the catalyst carrier according to claim 1, wherein: the metal base is a stainless base.

9. A catalyst carrier, comprising:
   a metal base;
   a mixed thin film, being at least one thin film that exists on the metal base, composed of metal and ceramics formed by spraying aerosol on the metal base, with metal powders and ceramic powders mixed therein;
   a plurality of holes formed in the mixed thin film by dissolving and removing metal of the mixed thin film, to carry the catalyst thereon; and
   a first thin film made of ceramics provided between the metal base and the mixed thin film,
   wherein the first thin film is formed by spraying the aerosol of the ceramic powders on the metal base, and the mixed thin film is formed on the first thin film as a second thin film.

10. The catalyst carrier according to claim 9, wherein: the catalyst is carried on a plurality of holes of the mixed thin film.

11. The catalyst carrier according to claim 9, wherein: a thickness from a surface of the metal base to a surface of the mixed thin film is set at 0.1 μm to 100 μm.

12. The catalyst carrier according to claim 9, wherein: a surface of each metal powder is oxidized.

13. The catalyst carrier according to claim 9, wherein: the catalyst is platinum.

14. The catalyst carrier according to claim 9, wherein: the metal powders are any one of copper, nickel, tin, lead, silver, or aluminum powders.

15. The catalyst carrier according to claim 9, wherein: the ceramic powders are any one of alumina, niobium oxide, titania, or magnesia powders or the mixture thereof.

16. The catalyst carrier according to claim 9, wherein: the metal base is a stainless base.

17. An electrode of a fuel battery cell, comprising:
   a metal base;
   a mixed thin film, being at least one thin film that exists on the metal base, composed of metal and ceramics formed by spraying aerosol on the metal base, with metal powders and ceramic powders mixed therein; and
   a plurality of holes formed in the mixed thin film by dissolving and removing metal of the mixed thin film, to carry the catalyst thereon.

18. The electrode of the fuel battery cell according to claim 17, comprising:
   a first thin film made of ceramics, between the metal base and the mixed thin film,
   wherein the first thin film is formed by spraying the aerosol of ceramic powders on the metal base, and the mixed thin film is formed on the first thin film as a second thin film.

19. A method of manufacturing a catalyst carrier, comprising the steps of:
   forming a mixed thin film in which at least metal and ceramics are mixed on a metal base, by spraying aerosol on the metal base, with metal powders and ceramic powders mixed therein; and
   making the mixed thin film porous, by dissolving the metal of the mixed thin film into acid or alkaline solution to remove this metal,
   wherein a thickness from a surface of the metal base to a surface of the mixed thin film is 0.1 μm to 100 μm.

20. A catalyst carrier, comprising:
   a metal base;
   a mixed thin film, being at least one thin film that exists on the metal base, composed of metal and ceramics formed by spraying aerosol on the metal base, with metal powders and ceramic powders mixed therein; and
   a plurality of holes formed in the mixed thin film by dissolving and removing metal of the mixed thin film, to carry the catalyst thereon,
   wherein a thickness from a surface of the metal base to a surface of the mixed thin film is set at 0.1 μm to 100 μm.

* * * * *